(12) United States Patent
Kubo (10) Patent No.: US 8,477,171 B2
(45) Date of Patent: Jul. 2, 2013

(54) IMAGE FORMING APPARATUS WITH SELECTIVE APPLICATION OF LIGHT SOURCE

(75) Inventor: Isao Kubo, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 693 days.

(21) Appl. No.: 12/715,378

(22) Filed: Mar. 1, 2010

(65) Prior Publication Data

US 2010/0220368 A1    Sep. 2, 2010

(30) Foreign Application Priority Data

Mar. 2, 2009   (JP) ................................. 2009-048304

(51) Int. Cl.
*B41J 2/435*    (2006.01)
*B41J 2/47*    (2006.01)

(52) U.S. Cl.
USPC .......................................... 347/237; 347/247

(58) Field of Classification Search
USPC ......... 347/339, 231, 234, 235, 243, 248–250, 347/259–261
See application file for complete search history.

(56) References Cited

U.S. PATENT DOCUMENTS

| | | | | |
|---|---|---|---|---|
| 5,155,540 | A | * | 10/1992 | Yamada et al. ................ 399/402 |
| 5,251,199 | A | * | 10/1993 | Utsumi et al. ............. 369/53.12 |
| 5,274,653 | A | | 12/1993 | Ohashi |
| 5,353,048 | A | * | 10/1994 | Kanai ........................... 347/246 |
| 5,912,694 | A | | 6/1999 | Miyake et al. |
| 6,172,696 | B1 | * | 1/2001 | Fujikura et al. ................ 347/115 |
| 7,535,580 | B2 | * | 5/2009 | Matsuoka ..................... 356/498 |
| 2004/0005159 | A1 | | 1/2004 | Ito et al. |
| 2004/0228374 | A1 | | 11/2004 | Inukai |

FOREIGN PATENT DOCUMENTS

| | | |
|---|---|---|
| JP | H04-260268 A | 9/1992 |
| JP | H05-145154 A | 6/1993 |
| JP | H05-281840 A | 10/1993 |
| JP | H06-015872 A | 1/1994 |
| JP | H09-015524 A | 1/1997 |
| JP | H10-093170 A | 4/1998 |

(Continued)

OTHER PUBLICATIONS

Japan Patent Office, Decision of Patent Grant for Japanese Patent Application No. 2009-048304 (counterpart to above-captioned patent application), dispatched Jul. 28, 2011.

(Continued)

*Primary Examiner* — Hai C Pham
(74) *Attorney, Agent, or Firm* — Baker Botts L.L.P.

(57) ABSTRACT

An image forming apparatus includes: a light source; a light-source driving unit; a photosensitive member including an image forming region; a determining unit determining a level of a rotation speed of the photosensitive member; a scanner unit exposing the photosensitive member by deflecting the light beam from the light source by a deflecting unit; a sensor receiving the light beam and outputs a detection signal; and a control unit controlling the image forming apparatus based on the detection signal output from the sensor. When the determining unit determines that the rotation speed is low, the light-source driving unit is configured to drive the light source to emit the light beam when a deflecting direction of the light beam is oriented toward the sensor and not to drive the light source to emit the light beam when the deflecting direction of the light beam is oriented toward the image forming region.

16 Claims, 8 Drawing Sheets

FOREIGN PATENT DOCUMENTS

| | | |
|---|---|---|
| JP | H11-242173 A | 9/1999 |
| JP | 2000-246953 A | 9/2000 |
| JP | 2003-211730 A | 7/2003 |
| JP | 2003-285468 A | 10/2003 |
| JP | 2004-046213 A | 2/2004 |
| JP | 2004-342655 A | 12/2004 |
| JP | 2005-086055 A | 3/2005 |
| JP | 2005-099569 A | 4/2005 |
| JP | 2007-021796 A | 2/2007 |

OTHER PUBLICATIONS

Japan Patent Office, Notification of Reasons for Refusal for Japanese Patent Application No. 2009-048304 (counterpart to above captioned patent application), dispatched Mar. 8, 2011.

* cited by examiner

IMAGE FORMING APPARATUS WITH SELECTIVE APPLICATION OF LIGHT SOURCE

CROSS-REFERENCE TO RELATED APPLICATIONS

This application claims priority from Japanese Patent Application No. 2009-048304 filed on Mar. 2, 2009, the entire subject matter of which is incorporated herein by reference.

TECHNICAL FIELD

The present invention relates to an image forming apparatus.

BACKGROUND

There has been proposed a known image forming apparatuses that scans a rotating photosensitive member with a laser light beam emitted from a laser diode. The known apparatus supplies the laser diode with a first bias current set to a current value less than a light-emission threshold value of the laser diode, regardless of whether the laser diode is caused to emit light, in order to improve the responsiveness of the laser diode.

SUMMARY

Illustrative aspects of the present invention provide an image forming apparatus that controls the image forming apparatus based on a light beam while inhibiting deterioration of a photosensitive member when a rotation speed of the photosensitive member is low.

DETAILED DESCRIPTION

<General Overview>

Incidentally, the photosensitive member is not constantly rotating, and may temporarily stop rotating from time to time.

According to the known image forming apparatus, when the rotation of the photosensitive member is stopped, even if the current value of the first bias current is less than the light-emission threshold value, for example, the same location of the photosensitive member is intensively irradiated with light output from the laser diode (light emitted when the current value is less than the light-emission threshold value results in light having an uneven wavelength rather than a laser light beam). This may accelerate the deterioration of the photosensitive member.

Therefore, illustrative aspects of the present invention provide an image forming apparatus that controls the image forming apparatus based on a light beam while inhibiting deterioration of a photosensitive member when a rotation speed of the photosensitive member is low.

According to a first illustrative aspect of the present invention, there is provided an image forming apparatus comprising: a light source that emits a light beam; a light-source driving unit that drives the light source; a photosensitive member that comprises an image forming region; a determining unit that determines a level of a rotation speed of the photosensitive member; a scanner unit that exposes the photosensitive member by deflecting the light beam emitted from the light source by a deflecting unit; a sensor that receives the light beam and outputs a detection signal; and a control unit that controls the image forming apparatus based on the detection signal output from the sensor, wherein when the determining unit determines that the rotation speed is low, the light-source driving unit is configured: to drive the light source to emit the light beam when a deflecting direction of the light beam is oriented toward the sensor; and not to drive the light source to emit the light beam when the deflecting direction of the light beam is oriented toward the image forming region.

According thereto, even when it is determined that the rotation speed of a photosensitive member is low, a light beam is emitted when a deflecting direction of the light beam is oriented toward a sensor. Thus, even when it is determined that the rotation speed of the photosensitive member is low, it is possible to control an image forming apparatus based on the light beam.

Moreover, when it is determined that the rotation speed of the photosensitive member is low, the light beam is not emitted when the deflecting direction of the light beam is oriented toward an image forming region. Thus, it is possible to inhibit the deterioration of the photosensitive member, specifically, the deterioration of the image forming region, caused due to the fact that the light beam irradiated intensively the same location of the image forming region.

Therefore, according to this invention, when the rotation speed of the photosensitive member is low, it is possible to control the image forming apparatus based on the light beam while inhibiting the deterioration of the photosensitive member.

According to a second illustrative aspect of the invention, in the image forming apparatus, wherein an intensity of the light beam emitted from the light source varies according to a current supplied to the light source, wherein the light-source driving unit supplies: a first current that drives the light source to emit a light beam having a first intensity for exposing the photosensitive member with an intensity of equal to or more than a predetermined exposure amount; and a second current that drives the light source to emit a light having a second intensity for exposing the photosensitive member with an intensity of less than the predetermined exposure amount, and wherein when the deflecting direction of the light beam is oriented toward the sensor, the light-source driving unit supplies the first current to the light source.

According thereto, when the deflecting direction of the light beam is oriented toward a sensor, the high-intensity light beam is caused to emit light. As a result, the accuracy for detecting the light beam is improved.

According to a third illustrative aspect of the invention, in the image forming apparatus, wherein when the determining unit determines that the rotation speed of the photosensitive member is high, the light-source driving unit constantly supplies the second current as a bias current to the light-source driving unit.

According thereto, when it is determined that the rotation speed of the photosensitive member is high, a light source is constantly supplied with a bias current. As a result, it is possible to improve the responsiveness of the light source. Moreover, this bias current is a low current with which to emit low-intensity light that is obtained when a photosensitive member is exposed with an intensity of less than a predetermined exposure amount. Thus, it is possible to inhibit deterioration of the photosensitive member, caused when the bias current is constantly supplied.

According to a fourth illustrative aspect of the invention, in the image forming apparatus, wherein when the determining unit determines that the rotation speed of the photosensitive member is low, the light-source driving unit stops supplying the bias current to the light source and makes a timing at which the light source is supplied with the first current is faster than a timing at which the first current is supplied when the rotation speed of the photosensitive member is high.

When it is determined that the rotation speed of the photosensitive member is low, if the bias current is constantly supplied, the deterioration of the photosensitive member may be accelerated due to the fact that the same location is intensively irradiated with the light beam even in the case of a low-intensity light beam, for example.

According to the fourth illustrative aspect of the invention, when it is determined that the rotation speed of the photosensitive member is low, the bias current is not supplied. As a result, it becomes possible to inhibit the deterioration of the photosensitive member.

However, since no bias current is supplied, if the light beam is emitted when the deflecting direction of the light beam is oriented toward a sensor, the responsiveness of the light source may be degraded. Therefore, with this invention, a timing at which the light source is supplied with a high current is faster than a timing at which the high current is supplied when it is determined that the rotation speed of the photosensitive member is high. This enables a decrease in degradation of the responsiveness of the light source.

According to a fifth illustrative aspect of the invention, in the image forming apparatus, wherein when the determining unit determines that the rotation speed of the photosensitive member is low, the light-source driving unit stops supplying the bias current to the light source and adjusts a value of the first current supplied to the light source to substantially the same value as the first current supplied to the light source when the rotation speed of the photosensitive member is determined to be high.

Further, according to a sixth illustrative aspect of the invention, in the image forming apparatus, wherein when the determining unit determines that the rotation speed of the photosensitive member is low, the light-source driving unit stops supplying the bias current to the light source and adjusts a value of the first current supplied to the light source to a value smaller than that of the first current supplied to the light source when the rotation speed of the photosensitive member is determined to be high.

According thereto, it is possible to ensure that the current value supplied to the light source does not exceed a rating.

According to a seventh illustrative aspect of the invention, in the image forming apparatus, wherein when the determining unit determines that the rotation speed of the photosensitive member is low, the light-source driving unit is configured: not to supply the bias current when the deflecting direction of the light beam is oriented toward the image forming region; and to supply the bias current when the deflecting direction of the light beam is oriented toward the sensor.

According thereto, it is possible to make it difficult for a problem to easily arise due to the fact that there is no bias current.

According to an eighth illustrative aspect of the invention, in the image forming apparatus, wherein the light-source driving unit is kept in an operable state even when the rotation speed of the photosensitive member is decreased.

According thereto, it is possible to reduce a decrease in responsiveness of the light-source driving unit.

According to a ninth illustrative aspect of the invention, the image forming apparatus further comprises: a speed detecting unit that detects the rotation speed of the photosensitive member, wherein the determining unit determines the level of speed by comparing a speed detected by the speed detecting unit and a predetermined speed.

According thereto, when a speed detected by the speed detecting unit and a predetermined speed are compared, it becomes possible to determine the level of the rotation speed of the photosensitive member.

According to a tenth illustrative aspect of the invention, the image forming apparatus further comprises: a photosensitive-member driving unit that rotationally drives the photosensitive member; and a conveying unit, which conveys a recorded medium one at a time, and which, after an image is formed on a first surface of the recorded medium, reverses and conveys the recorded medium by using power of the photosensitive-member driving unit in order to form an image on a second surface of the recorded medium, wherein when the conveying unit reverses the recorded medium, the power of the photosensitive-member driving unit is applied to the conveying unit so as to stop a rotation of the photosensitive member.

According thereto, even when the rotation of the photosensitive member is stopped as a result of power of photosensitive-member driving unit being used when conveying unit reverses a recorded medium, it is possible to control the image forming apparatus based on the light beam while inhibiting the deterioration of the photosensitive member.

According to the illustrative aspects of the present invention, when the rotation speed of the photosensitive member is low, it is possible to control an image forming apparatus based on a light beam while inhibiting the deterioration of a photosensitive member.

<Exemplary Embodiments>

Exemplary embodiments of the invention will now be described with reference to the drawings.

(First Exemplary Embodiment)

A first exemplary embodiment of the present invention will be described with reference to FIG. 1 to FIG. 5.

(1) Image Forming Apparatus

Figure 1:
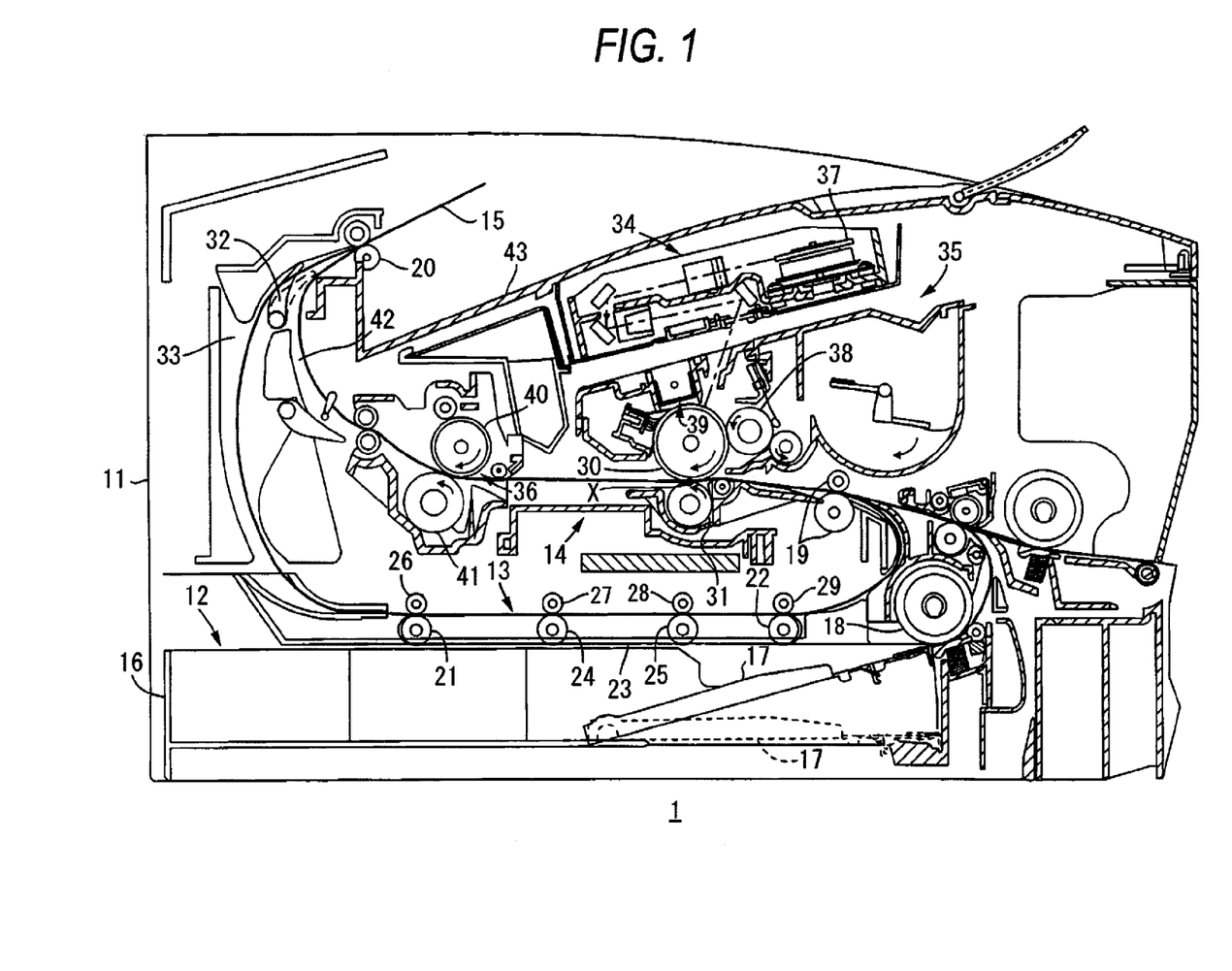
FIG. 1 is a schematic cross-sectional view of an image forming apparatus according to an exemplary embodiment of the invention.

FIG. 1 is a cross-sectional side view of main parts of an image forming apparatus 1. The image forming apparatus 1 includes such as a main body frame 11, a feeder unit 12, a conveying mechanism 13, an image forming unit 14, and a conveying motor M. Incidentally, a laser printer is one example of the image forming apparatus 1.

The feeder unit 12 includes a sheet feeding tray 16 on which recorded media such as a print sheet 15 are loaded, a press plate 17, and a sheet feeding roller 18. The press plate 17 is capable of rotating around its rear end part, and the print sheet 15 on the press plate 17 is pressed toward the sheet feeding roller 18. When the sheet feeding roller 18 is rotated, the print sheet 15 is sent out to a conveying path one by one.

The conveying mechanism 13 (one example of a conveying unit) includes: a pair of registration rollers 19; a pair of sheet discharge rollers 20; a drive roller 21; a driven roller 22; a belt 23 rolled around the drive roller 21 and the driven roller 22; two driven rollers 24 and 25 placed within the belt 23; and four press rollers 26, 27, 28, and 29 placed, by sandwiching the belt 23, to correspond to the drive roller 21 and the three driven rollers 22, 24, and 25. The print sheet 15 sent out from the feeder unit 12 onto the conveying path is registered by the registration rollers 19, and then, forwarded to a transferred position X. The transferred position X is a position at which a toner image on a photosensitive drum 30 (one example of a photosensitive member) is transferred to the print sheet 15, and is a position at which the photosensitive drum 30 and a transfer roller 31 come into contact.

Moreover, the conveying mechanism 13 is capable of conveying the print sheet 15 so that after an image is formed on one surface (top surface) of the print sheet 15, the print sheet 15 is automatically reversed and the image is then formed on the other surface (bottom surface) thereof. Specifically, when the rear end of the print sheet 15 is sandwiched by the sheet discharge rollers 20, a flapper 32 is rotated clockwise as indicated by the broken line in FIG. 1, and then, a switchback path 33 is released. Thereafter, the sheet discharge rollers 20 are reversely rotated. Thereby, the print sheet 15 is sent out to the switchback path 33 from a rear end side. The print sheet 15 sent out to the switchback path 33 is again sent out, with its bottom side up, to the conveying path from the rear end side. In this way, the image can be formed on the bottom surface.

An image forming unit 14 includes a scanner unit 34, a process cartridge 35, and a fixing part 36.

Figure 3:
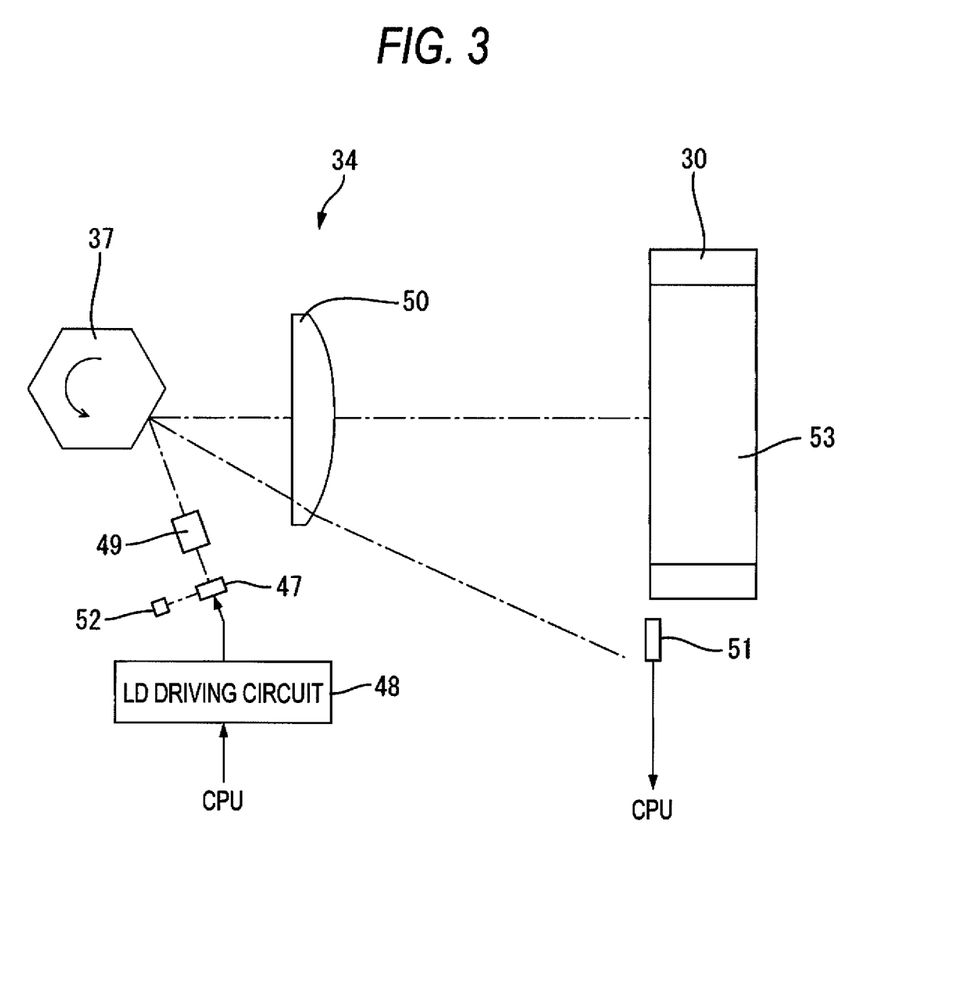
FIG. 3 is a schematic diagram of a scanner unit of the image forming apparatus.

The scanner unit 34 includes a polygon mirror 37 (one example of a deflecting unit), and a laser diode 47 (one example of a light source, see FIG. 3). A light beam (dashed line in FIG. 3) caused to emit light from the laser diode 47 (hereinafter, referred to as "LD") is deflected by the polygon mirror 37 and irradiates onto the top surface of a photosensitive drum 30. The scanner unit 34 will be described in detail later.

The process cartridge 35 includes a developing roller 38, a photosensitive drum 30, and a scorotron-type charger 39. The charger 39 uniformly charges the top surface of the photosensitive drum 30 to a positive polarity. The top surface of the photosensitive drum 30 charged to the positive polarity is exposed by the light beam caused to emit light from the scanner unit 34 so that an electrostatic latent image is formed. Subsequently, toner carried on the top surface of the developing roller 38 is supplied to the electrostatic latent image formed on the photosensitive drum 30, and then, the resultant toner is developed.

The fixing part 36 causes the toner to be thermally fixed onto the print sheet 15 while the print sheet 15 passes between a heating roller 40 and a press roller 41. The print sheet 15 that has been thermally fixed is discharged onto a sheet discharge tray 43 via a sheet discharge path 42.

A conveying motor M (one example of a photosensitive-member driving unit) is commonly used as a driving source for rotationally driving the photosensitive drum 30 and the developing roller 38 and as a driving source for driving the conveying mechanism 13. The conveying mechanism 13 reverses the print sheet 15 by using the driving force of the conveying motor M. At this time, the conveying motor M is reversely rotated. When the photosensitive drum 30 and the developing roller 38 are also reversely rotated if the conveying motor M is reversely rotated, various types of problems arise. To avoid this, it is configured such that the photosensitive drum 30 and the conveying motor M (or the developing roller 38 and the conveying motor M) are coupled so that a rotationally driving force is transmitted in a single direction only via a one-way clutch, etc., and when the print sheet 15 is reversed, the rotation of the photosensitive drum 30 is stopped.

(2) Electrical Configuration of Image Forming Apparatus

Figure 2:
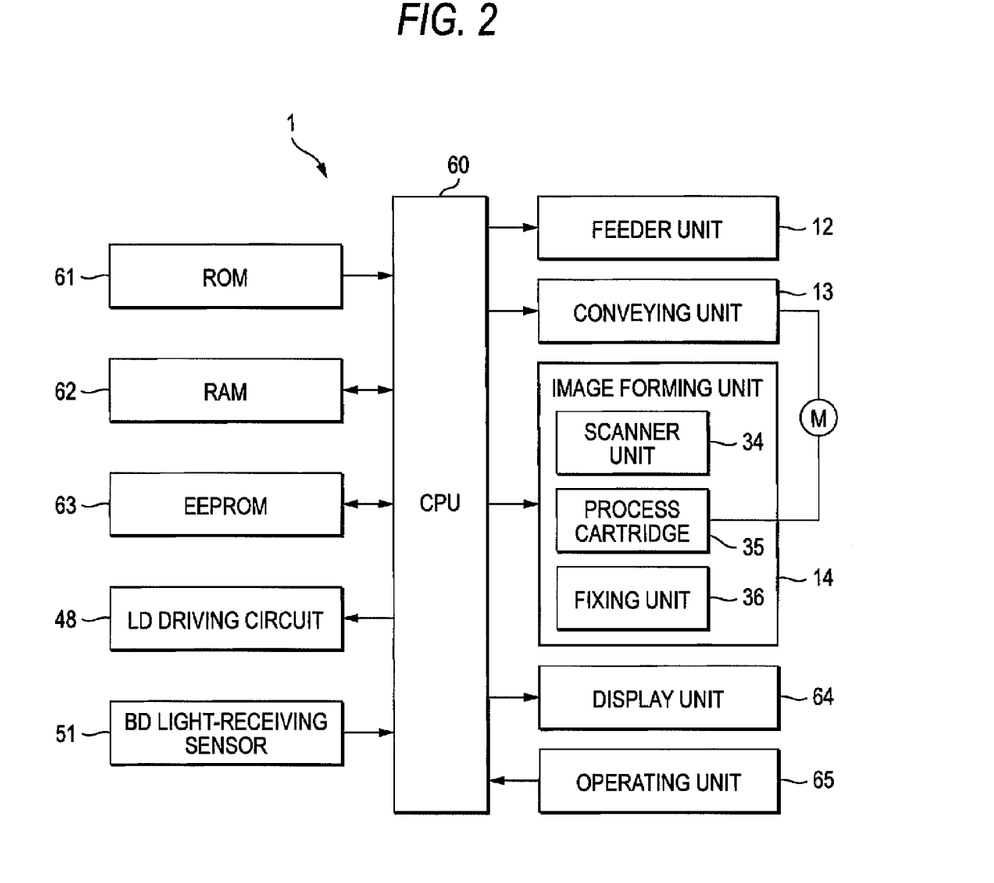
FIG. 2 is a block diagram s of the image forming apparatus.

Referring to FIG. 2, an electrical configuration of the image forming apparatus 1 will be described.

The image forming apparatus 1 includes a CPU 60, a ROM 61, a RAM 62, an EEPROM 63, a BD light-receiving sensor 51, an LD driving circuit 48, a feeder unit 12, an image forming unit 14, a display unit 64, and an operating unit 65. In FIG. 2, the BD light-receiving sensor 51 and the LD driving circuit 48 are shown separately from the image forming unit 14; however, these components configure part of the image forming unit 14.

The CPU 60 (one example of a light-source driving unit, a determining unit, a speed detecting unit, and a control unit) executes various types of programs stored in the ROM 61 thereby to control each part of the image forming apparatus 1. In the ROM 61, various types of programs executed by the CPU 60 and tables referred to when the CPU 60 executes various types of processes are stored. The RAM 62 is used as a primary storage device for the CPU 60 to execute various types of processes. The EEPROM 63 is a nonvolatile memory capable of storing information even when the power is stopped, and stores various types of setting information, etc.

The display unit 64 is configured by various types of lamps, a liquid crystal panel, etc. The operating unit 65 is configured by an input panel, etc., and a user is capable of giving a print command, for example, by operating the operating unit 65 with reference to the display unit 64.

The BD light-receiving sensor 51 and the LD driving circuit 48 will be described in detail later.

In addition, the image forming apparatus 1 includes a network interface (not shown) for connecting to an external device are arranged. The user is also capable of giving a print command from the external device via the network interface.

(3) Scanner Unit

FIG. 3 is a schematic diagram showing the scanner unit 34 from a different angle from FIG. 1. The scanner unit 34 includes: an LD 47 emitting a light beam; an LD driving circuit 48 for controlling the LD 47; a first lens unit 49 configured by a collimator lens, a cylindrical lens, etc.; the polygon mirror 37; a second lens unit 50 configured by an fθ lens, a cylindrical lens, etc.; a BD light-receiving sensor 51, a polygon motor (not shown) for driving the polygon mirror; and a polygon-motor driving circuit (one example of a control unit) (not shown) for controlling the polygon motor.

The LD driving circuit 48 (one example of a light-source driving unit) includes: a switching current circuit for supplying the LD 47 with a switching current (one example of a high current) with which to cause a high-intensity light beam (laser light beam), which is obtained when the photosensitive drum 30 is exposed with light having an intensity of equal to or more than a predetermined exposure amount, to emit light; and a bias current circuit for supplying the LD 47 with a bias current (one example of a low current) with which to emit low-intensity light (light having an uneven wavelength rather than a laser light beam) that is obtained when the photosensitive drum 30 is exposed with light having an intensity of less than the predetermined exposure amount.

The "predetermined exposure amount" is an exposure amount that acts as a boundary in determining whether the photosensitive drum 30 is exposed to the extent that the quality of the image is affected when the photosensitive drum 30 rotating at a speed equal to or faster than a predetermined speed is exposed. The level of the exposure amount of the "predetermined exposure amount" is appropriately determined by a designer, et al., through experimentation, etc. The "high-intensity light beam exposed with an intensity of equal to or more than a predetermined exposure amount" is a light beam having an intensity of equal to or more than the above-described exposure amount. The "low-intensity light exposed with an intensity of less than the predetermined exposure amount" is light having an intensity of less than the above-described exposure amount.

The LD driving circuit 48 supplies the LD 47 with an switching current when a Video signal is output from the CPU 60, and supplies the LD 47 with a bias current when a bias signal is output.

The light beam caused to emit light from the LD 47 irradiates onto the polygon mirror 37 via the first lens unit 49. The polygon mirror 37 is rotated at high speed by the polygon motor. The irradiated light beam is deflected by the polygon mirror 37, and irradiates onto the photosensitive drum 30 via the second lens unit 50.

The polygon mirror 37 is configured by six mirror surfaces, and cyclically deflects the light beam. In the first exemplary embodiment, a period during which the light beam is deflected by one mirror surface of the polygon mirror 37 is defined as one cycle. Therefore, in the first exemplary embodiment, it takes six cycles for the polygon mirror 37 to make one rotation.

The BD light-receiving sensor 51 (one example of a sensor) (hereinafter, referred to as "BD sensor") is placed at a position at which the light beam deflected by the polygon mirror 37 passes before the light beam passes through the photosensitive drum 30. It is noted that the BD sensor 51 may be optionally placed at a position at which the light beam passes after the light beam passes through the photosensitive drum 30. The BD sensor 51 receives the light beam caused to emit light from the LD 47, and outputs a BD (Beam Detect) signal (one example of a detection signal) to the CPU 60. The BD signal is sometimes called a horizontal synchronization signal.

An APC light-receiving sensor 52 (one example of a sensor) (hereinafter, referred to as "APC sensor") is placed near the LD 47. Once the LD 47 emits a light beam, the APC sensor 52 receives the light beam constantly and outputs to the LD driving circuit 48 a sensor output (one example of a detection signal) that is according to the strength of the received light beam.

In the photosensitive drum 30, a region 53 is an image forming region 53 in which an electrostatic latent image is formed. In the first exemplary embodiment, the electrostatic latent image is not formed on the entire top surface of the photosensitive drum 30, but formed in the image forming region 53 that is inside the entire top surface excluding the both ends in an axial direction of the photosensitive drum 30.

(4) Rotation Control of Polygon Mirror

The CPU 60 detects the rotation speed of the polygon mirror 37 from a time interval during which the BD signal is output, and performs feedback control on the polygon motor so that the rotation speed of the polygon mirror 37 maintains a predetermined speed.

In the first exemplary embodiment, not only while the rotation speed of the photosensitive drum 30 is equal to or more than the predetermined speed (while it is determined that the rotation speed is high) but also while the rotation speed of the photosensitive drum 30 is less than the predetermined speed (while it is determined that the rotation speed is low), the CPU 60 continuously maintains the rotation speed of the polygon mirror 37 at the predetermined speed based on the BD signal. While the rotation speed of the photosensitive drum 30 is less than the predetermined speed, the electrostatic latent image is not formed in the image forming region 53. Thus, during that period, the rotation of the polygon mirror 37 may be stopped. However, if the rotation of the polygon mirror 37 is stopped, it requires a certain time until the rotation speed becomes stable when the rotation of the polygon mirror 37 is resumed. Therefore, in the first exemplary embodiment, even while the rotation speed of the photosensitive drum 30 is less than the predetermined speed, the rotation speed of the polygon mirror 37 is continuously maintained at the predetermined speed.

In this case, whether the rotation speed of the photosensitive drum 30 is equal to or more than the predetermined speed can be determined as follows: For example, the CPU 60 calculates the rotation speed of the photosensitive drum 30 by' using a pulse signal output to the conveying motor M, a timer (not shown), etc. In this case, when the rotation speed of the photosensitive drum 30 is equal to or more than the predetermined speed, the CPU 60 determines that the rotation speed is high, and when the rotation speed is less than the predetermined speed, the CPU 60 determines that the rotation speed is low. Alternately, the number of rotations of an encoder, which is arranged in the photosensitive drum 30, may be detected by a photoelectric sensor, and based on the detection result and a certain time counted by a timer, the rotation speed may be detected.

(5) Auto Power Control (APC)

The LD driving circuit 48 automatically adjusts the intensity of the light beam (LD light-emission intensity) caused to emit light from the LD 47 by adjusting a value of a current supplied to the laser diode based on the sensor output from the APC light-receiving sensor 52. This automatic adjustment is called APC.

In the first exemplary embodiment, not only while the rotation speed of the photosensitive drum 30 is equal to or more than the predetermined speed but also while the rotation speed of the photosensitive drum 30 is less than the predetermined speed, the intensity of the light beam is adjusted by the APC. The reason for this is that when the APC is stopped, it requires a certain time until the intensity of the light beam becomes stable when the APC is resumed.

(6) Rotation Control of Photosensitive Drum

Figure 4:
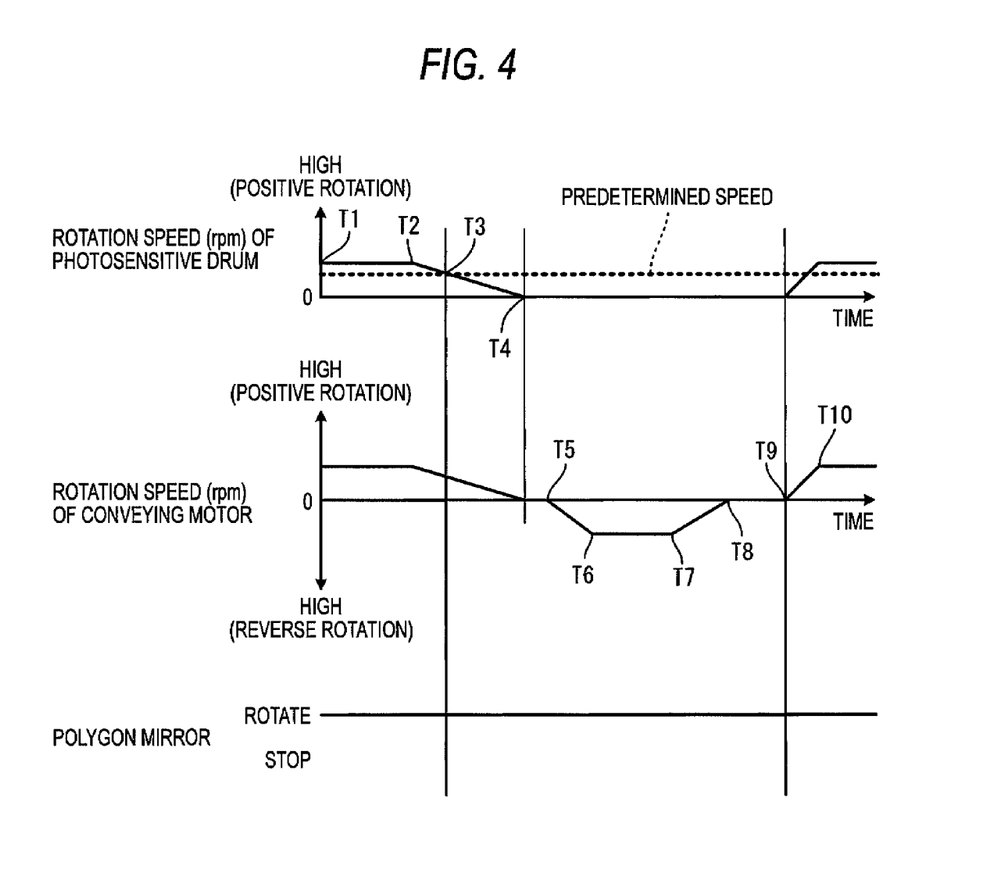
FIG. 4 is a timing chart for explaining rotation control of a photosensitive member of the image forming apparatus according to a first exemplary embodiment.

FIG. 4 is a timing chart for explaining the rotation control, by the CPU 60, of the photosensitive drum 30. Herein, rotation control in a period during which the formation of an image on the top surface of the print sheet 15 is finished until the formation of the image on the bottom surface is enabled after the print sheet 15 is reversed will be explained as an example.

A period from a time point T1 until a time point T2 is a standby state in which the image forming apparatus 1 stands by after the image forming apparatus 1 has finished forming the image on the top surface of the print sheet 15. In the standby state, the photosensitive drum 30 makes a constant speed rotation at a constant speed.

When the operation for reversing the print sheet 15 is started at the time point T2, the CPU 60 decreases the rotation speed of the photosensitive drum 30 by gradually decreasing the rotation speed of the conveying motor M. In the illustrated example, at a time point T3, the rotation speed of the photosensitive drum 30 reaches the predetermined speed, and at a time point T4, the speed of the photosensitive drum 30 reaches 0 [rpm].

When the speed of the photosensitive drum 30 reaches 0 [rpm] at the time point T4, the CPU 60 stands by until a time point T5. At the time point T5, the CPU 60 starts reversing the rotation of the conveying motor M. The driving force for reversing the rotation of the conveying motor M is not transmitted to the photosensitive drum 30, and thus, the photosensitive drum 30 remains stopped.

When the rotation speed of the conveying motor M reaches a constant rotation speed at a time point T6, the CPU 60 causes the conveying motor M to rotate while maintaining the constant rotation speed until a time point T7 at which reversing the print sheet 15 is completed. When the time point T7 is reached, the CPU 60 gradually decreases the rotation speed of the conveying motor M.

When the rotation speed of the conveying motor M reaches 0 [rpm] at a time point T8, the CPU 60 stands by until a time point T9. At the time point T9, the CPU 60 again starts the positive rotation of the conveying motor M. Thereby, the rotation of the photosensitive drum 30 is resumed.

When the rotation speed of the conveying motor M reaches a constant speed at a time point T10, the photosensitive drum 30 makes a constant speed rotation at the constant speed described above. This enables the formation of the image on the bottom surface. This is followed by the formation of the image on the bottom surface of the print sheet 15.

(7) Light-Emission Control of Laser Diode

Figure 5:
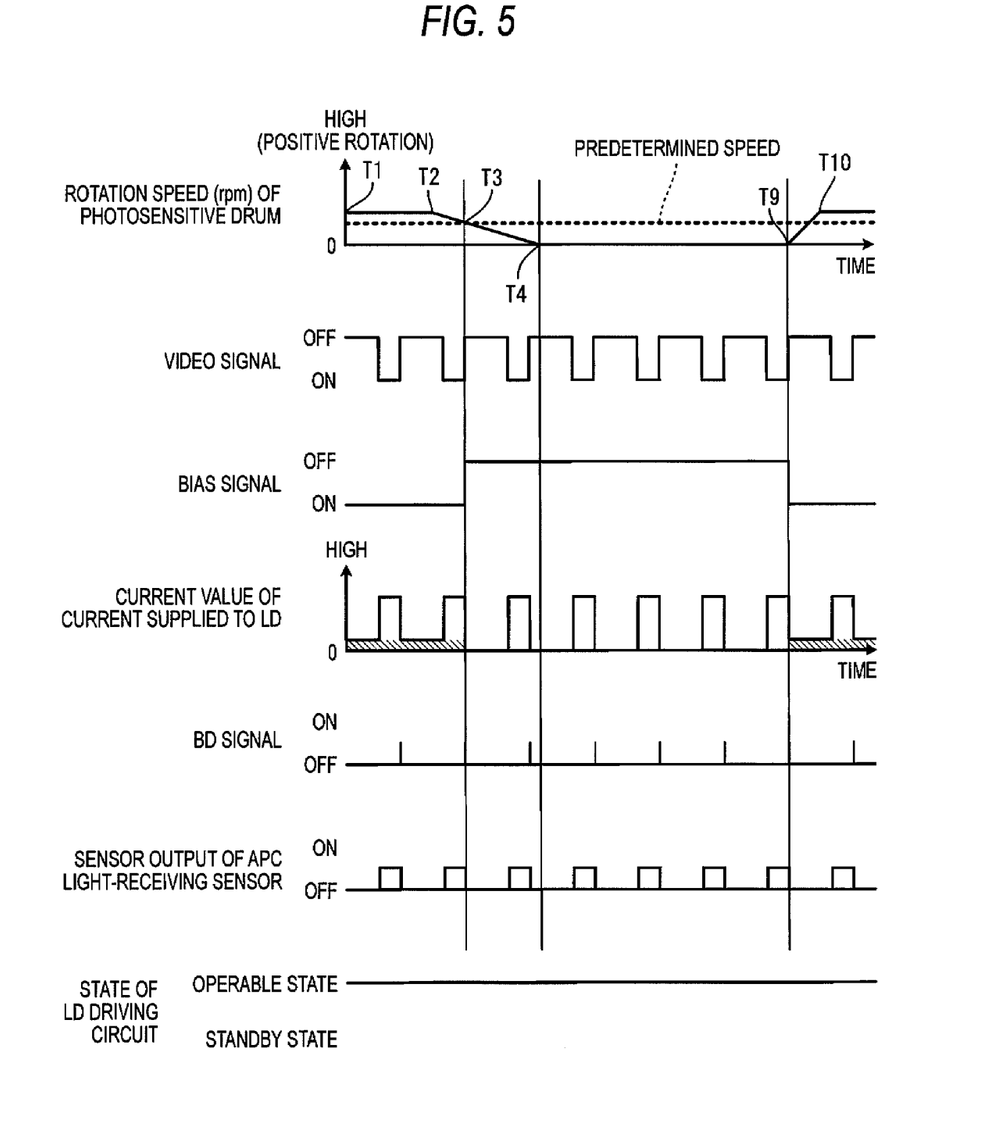
FIG. 5 is a timing chart showing timings at which various types of signals and currents are output.

FIG. 5 is a timing chart showing timings at which various types of signals and currents are output. For the sake of understanding, the "rotation speed (rpm) of the photosensitive drum" is shown together in the figure.

(7-1) Video Signal

The Video signal is output when the electrostatic latent image is formed in the image forming region 53 and when the light beam is emitted in order to obtain the BD signal. Moreover, as described above, when the LD 47 emits the light beam, the APC sensor 52 receives the light beam constantly, and thus, it can be said that the Video signal output in order to form the electrostatic latent image in the image forming region 53 and the Video signal output in order to obtain the BD signal are both signals used for obtaining a sensor output from the APC light-receiving sensor 52.

It is when the rotation speed of the photosensitive drum 30 is equal to or more than the predetermined speed that the Video signal used for forming the electrostatic latent image in the image forming region 53 is output. However, FIG. 5 shows a period during which the formation of the image on the top surface of the print sheet 15 is finished until the formation of the image on the bottom surface thereof is started. Thus, the Video signal used for forming the electrostatic latent image in the image forming region 53 is not shown.

When the electrostatic latent image is formed in the image forming region 53, the CPU 60 outputs to the LD driving circuit 48 the Video signal used for forming the electrostatic latent image in the image forming region 53 at a timing that is based on the BD signal. The LD driving circuit 48 supplies the LD 47 with the switching current when the Video signal is output. As a result, a high-intensity light beam is emitted from the LD 47. With this light beam, the image forming region 53 is exposed, and as a result, one line of the electrostatic latent image according to the Video signal is formed in the image forming region 53.

It is when the deflecting direction of the light beam is oriented at least toward the BD sensor 51 that the Video signal used for obtaining the BD signal is output regardless of whether the rotation speed of the photosensitive drum 30 is equal to or more than the predetermined speed. The Video signals shown in FIG. 5 are all Video signals used for obtaining the BD signal. When the deflecting direction of the light beam is oriented at least toward the BD sensor 51, the CPU 60 outputs to the LD driving circuit 48 the Video signal used for obtaining the BD signal.

In this case, "when being oriented at least toward the BD sensor 51" may optionally include a case where being oriented toward other than the "image forming region 53" if when being oriented toward the BD sensor 51 is included. After all, when being oriented toward the "image forming region 53" is not included in "when being oriented at least toward the BD sensor 51."

Whether the deflecting direction of the light beam is oriented toward the BD sensor 51 can be determined by a value on a counter for counting a clock signal, for example. The CPU 60 regards a period during which the value on the counter is within a specific range (for example, 100 to 200) as a period during which the deflecting direction of the light beam is oriented toward the BD sensor 51, and outputs the Video signal.

The reason why the Video signal used for obtaining the BD signal is output even when the rotation speed of the photosensitive drum 30 is less than the predetermined speed is, as described above, to perform rotation control of the polygon mirror 37 and the APC even when the rotation speed of the photosensitive drum 30 is less than the predetermined speed.

The LD driving circuit 48 supplies the LD 47 with the switching current when the Video signal is output. As a result, a high-intensity light beam is emitted from the LD 47. The light beam is received by the BD sensor 51, and the BD signal is output to the CPU 60.

A "current value of current supplied to the LD" shown in FIG. 5 is a combined current of the switching current and the bias current in a period during which the bias current described below is supplied, and is only the switching current in a period during which the bias current is not supplied. A portion shaded in the "current value of current supplied to the LD" indicates the bias current.

(7-2) Bias Signal

The bias signal is output when the bias current is supplied.

It is when the rotation speed of the photosensitive drum 30 is equal to or more than the predetermined speed that the bias signal is output. The CPU 60 calculates the rotation speed of the photosensitive drum 30 from a pulse signal output to the conveying motor M, a timer, etc., for example. The CPU 60 determines that the rotation speed is high when the rotation speed of the photosensitive drum 30 is equal to or more than the predetermined speed, and in this case, outputs the bias signal to the LD driving circuit 48 constantly regardless of whether the deflecting direction of the light beam is oriented toward the photosensitive drum 30 or toward the BD sensor 51. The reason for this is to reduce a decrease in responsiveness of the LD 47. Once supplying the current is stopped, the LD 47 requires a time until the LD 47 emits the light beam even when the LD 47 is thereafter supplied with the current. When the bias current is supplied, it becomes possible to reduce a decrease in responsiveness of the LD 47 caused when the switching current is supplied.

The LD 47 emits light by the bias current, and the light emitted by the bias current is low-intensity light that is obtained when the photosensitive drum 30 is exposed with an intensity of less than a predetermined exposure amount. Thus, the photosensitive drum 30 is not greatly affected. Moreover, it is when the rotation speed of the photosensitive drum 30 is equal to or more than the predetermined speed that the bias current is supplied. Therefore, the same location of the photosensitive drum 30 will not be intensively irradiated with the light.

The purpose of the APC is to adjust the intensity of the light beam emitted by the Video signal, and for this reason, an adjustment in which the intensity of the light emitted by the bias signal when the Video signal is not output is equal to the "intensity of the light beam emitted by the Video signal" is not performed.

The CPU 60 stops outputting the bias signal when the rotation speed of the photosensitive drum 30 is less than the predetermined speed. The reason for this is that the same location of the photosensitive drum 30 may be intensively irradiated with the light emitted by the bias current when the rotation speed of the photosensitive drum 30 is less than the predetermined speed. If the same location is intensively irradiated with light even if the light is low in intensity, the deterioration of the photosensitive drum 30 may be accelerated. Therefore, when the rotation speed of the photosensitive drum 30 is less than the predetermined speed, the CPU 60 stops the bias signal.

(7-3) Light Emission of the Light Beam to the Image Forming Region when the Rotation Speed of the Photosensitive Drum is Less than the Predetermined Speed It is when the rotation speed of the photosensitive drum 30 is equal to or more than the predetermined speed that the Video signal used for forming the electrostatic latent image in the image forming region 53 is output. Thus, when the rotation speed of the photosensitive drum 30 is less than the predetermined speed, the Video signal used for forming the electrostatic latent image is not output even when the deflecting direction of the light beam is oriented toward the image forming region 53.

The Video signal used for obtaining the BD signal is output regardless of whether the rotation speed of the photosensitive drum 30 is equal to or more than the predetermined speed, but it is when the deflecting direction of the light beam is oriented at least toward the BD sensor 51 (which does not include when being oriented toward the "image forming region 53") that the Video signal used for obtaining the BD signal is output. Therefore, the Video signal is not output when the deflecting direction of the light beam is oriented toward the image forming region 53.

Moreover, it is when the rotation speed of the photosensitive drum 30 is equal to or more than the predetermined speed that the bias signal is output. Thus, when the rotation speed of the photosensitive drum 30 is less than the predetermined speed, the bias signal is not output.

That is, if the rotation speed of the photosensitive drum 30 is less than the predetermined speed, neither signal is output when the deflecting direction of the light beam is oriented toward the image forming region 53 of the photosensitive drum 30. That is, when the rotation speed of the photosensitive drum 30 is less than the predetermined speed, the light beam will not be emitted toward the image forming region 53 of the photosensitive drum 30.

It is noted that when the rotation speed of the photosensitive drum 30 is less than the predetermined speed, the light beam should not be emitted when the deflecting direction is oriented toward at least the image forming region 53, and the light beam may be optionally emitted when the deflecting direction is oriented toward the photosensitive drum 30 other than the image forming region 53.

(8) Adjustment of Switching Current

When the rotation speed of the photosensitive drum 30 is equal to or more than the predetermined speed, the bias signal is output, and thus, the Video signal used for forming the electrostatic latent image in the image forming region 53 or the Video signal used for obtaining the BD signal is output, the combined current of the bias current and the switching current is supplied to the LD 47.

On the other hand, when the rotation speed of the photosensitive drum 30 is less than the predetermined speed, the bias signal is not output. Thus, when the Video signal used for obtaining the BD signal is output, only the switching current is supplied.

That is, the value of the current, which is supplied to the LD 47 when the deflecting direction of the light beam is oriented toward the BD sensor 51, differs depending on whether the rotation speed of the photosensitive drum 30 is equal to or more than the predetermined speed or less than the predetermined speed. Immediately after the rotation speed has fallen below the predetermined speed, only a small current reduced by as much as the bias current is supplied.

When the current to be supplied is small, the intensity of the light beam becomes small corresponding thereto, and thus, the value of the switching current is adjusted by the APC. As a result, the value of the switching current supplied to the LD 47 when the rotation speed is less than the predetermined speed is adjusted to the substantially the same value as the combined current obtained by combining the bias current and the switching current and supplied to the LD 47 when the rotation speed of the photosensitive drum 30 is equal to or more than the predetermined speed.

(9) State of LD Driving Circuit

The LD driving circuit 48 is maintained in an operable state capable of supplying a current to the LD 47 even when the rotation speed of the photosensitive drum 30 is less than the predetermined speed.

When the rotation speed of the photosensitive drum 30 is less than the predetermined speed, the light beam is not emitted if the deflecting direction of at least the light beam is oriented toward the image forming region 53. Thus, during that period, it is conceivable to decrease the power consumption by bringing the LD driving circuit 48 in a standby state where no operation is enabled. However, the LD driving circuit 48 requires a certain amount of time until restore from the standby state to the operable state. This may delay supplying the current, possibly resulting in delaying the light emission of the light beam.

Even when the rotation speed of the photosensitive drum 30 is less than the predetermined speed, such a delay in the light emission of the light beam can be decreased when the LD driving circuit 48 is maintained in the operable state.

According to the image forming apparatus 1 based on the first exemplary embodiment of the present invention as described above, even when the rotation speed of the photosensitive drum 30 is less than the predetermined speed in the period during which the image forming apparatus 1 should be controlled, for example, when the rotation of the photosensitive drum 30 is stopped as a result of use of the power of the conveying motor M when the conveying mechanism 13 reverses the print sheet 15, as long as the deflecting direction of the light beam is oriented toward the sensor, the light beam is emitted. Therefore, even when the rotation speed of the photosensitive drum 30 is less than the predetermined speed, it is possible to control the image forming apparatus 1 based on the light beam as in the rotation control of the polygon mirror and the APC.

Moreover, according to the image forming apparatus 1, when the rotation speed of the photosensitive drum 30 is less than the predetermined speed, if the deflecting direction of the light beam is oriented toward the image forming region 53, the light beam is not emitted. Thus, it is possible to inhibit the deterioration of the photosensitive drum 30, in particular, the deterioration of the image forming region 53, caused when the same location of the image forming region 53 is intensively irradiated with the light beam.

Therefore, according to the image forming apparatus 1, when the rotation speed of the photosensitive drum 30 is low, it is possible to control the image forming apparatus 1 based on the light beam while inhibiting the deterioration of the photosensitive drum 30.

Moreover, according to the image forming apparatus 1, when the deflecting direction of the light beam is oriented toward the BD sensor 51, the high-intensity light beam is emitted. As a result, the accuracy for detecting the light beam is improved.

Moreover, according to the image forming apparatus 1, when the rotation speed of the photosensitive drum 30 is equal to or more than the predetermined speed, the bias current is constantly supplied to the LD 47, and thereby, it becomes possible to improve the responsiveness of the LD 47. Moreover, this bias current is a low current with which to emit low-intensity light that is obtained when the photosensitive drum 30 is exposed with an intensity of less than a predetermined exposure amount. Thus, it is possible to inhibit the deterioration of the photosensitive drum 30, caused when the bias current is constantly supplied.

Moreover, according to the image forming apparatus 1, the LD driving circuit 48 is maintained in the operable state even when the rotation speed of the photosensitive drum 30 is less than the predetermined speed. Thus, it is possible to reduce a decrease in responsiveness of the LD driving circuit 48.

(Second Exemplary Embodiment)

Subsequently, a second exemplary embodiment of the present invention will be described with reference to FIG. 6.

In the second exemplary embodiment, when the rotation speed of the photosensitive drum 30 is less than the predetermined speed, a timing at which to output the Video signal used for obtaining the BD signal is faster than a timing at which to output the Video signal used for obtaining the BD signal when the rotation speed of the photosensitive drum 30 is equal to or more than the predetermined speed.

In other words, when the rotation speed of the photosensitive drum 30 is less than the predetermined speed, at the time of causing the LD 47 to emit light in order to obtain the BD signal, a timing at which to start supplying the switching current is faster than a timing at which to start supplying the switching current when the rotation speed of the photosensitive drum 30 is equal to or more than the predetermined speed.

Figure 6:
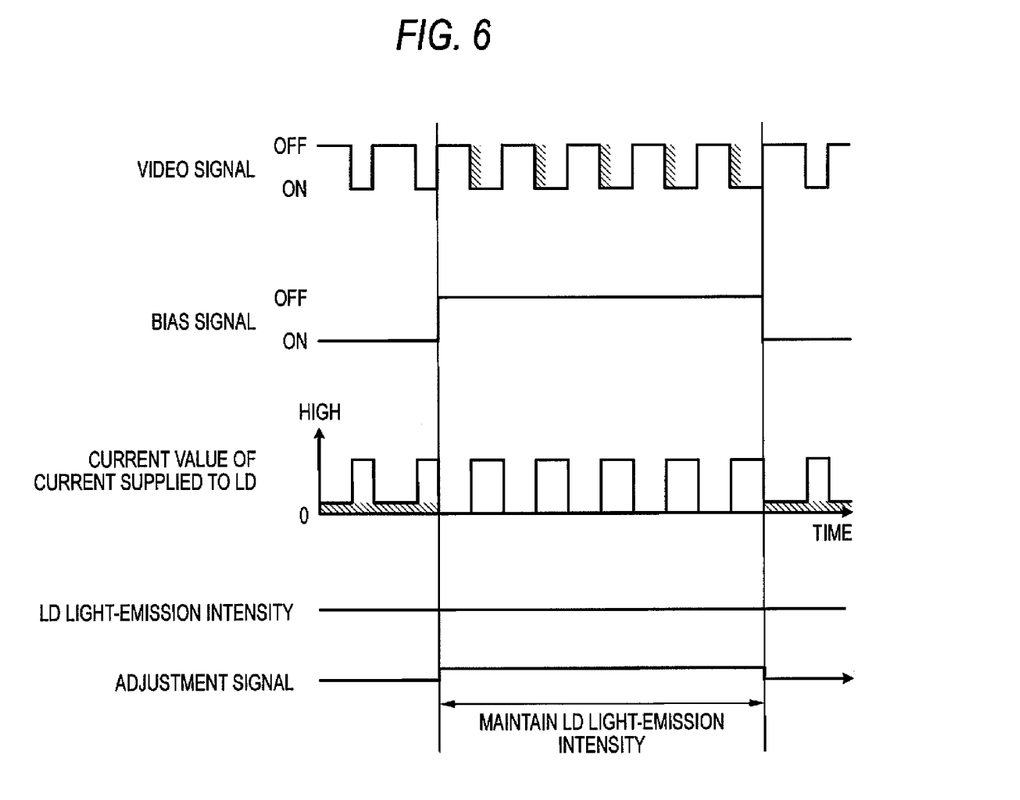
FIG. 6 is a timing chart according to a second exemplary embodiment of the present invention.

FIG. 6 is a timing chart according to the second exemplary embodiment. Also in the second exemplary embodiment, when the rotation speed of the photosensitive drum 30 is less than the predetermined speed, the bias current is not supplied. A region indicated by an oblique line in a Video signal shown in the FIG. 6 indicates a zone in which the Video signal is output at an advanced timing.

An adjustment signal shown in FIG. 6 is a signal used for setting a target intensity when the intensity of the light beam (LD light-emission intensity) is automatically adjusted by the APC, and is output from the CPU 60 to the LD driving circuit 48. The LD driving circuit 48 executes the APC so that the intensity of the light beam reaches this target intensity. In the second exemplary embodiment, the CPU 60 outputs to the LD driving circuit 48 an adjustment signal that makes the value of the switching current output when the rotation speed of the photosensitive drum 30 is less than the predetermined speed large so as to become substantially the same value as the combined current obtained by combining the bias current and the switching current of the switching current output when the rotation speed of the photosensitive drum 30 is equal to or more than the predetermined speed. According thereto, in the second exemplary embodiment, even when the rotation speed of the photosensitive drum 30 is either equal to or more than the predetermined speed or less than the predetermined speed, the LD light-emission intensity is set to constant.

Although in FIG. 5 in the first exemplary embodiment, the LD light-emission intensity and the adjustment signal are not shown, the waveforms of the LD light-emission intensity and the adjustment signal in the first exemplary embodiment are the same as those in the second exemplary embodiment.

When the rotation speed of the photosensitive drum 30 is less than the predetermined speed, if the timing at which to output the Video signal used for obtaining the BD signal is advanced, the timing at which to start causing the LD 47 to emit light is advanced. Thus, it becomes possible to reduce the decrease in responsiveness of the LD 47.

In other respects, the second exemplary embodiment is substantially identical to the first exemplary embodiment.

(Third Exemplary Embodiment)

Subsequently, a third exemplary embodiment of the present invention will be described with reference to FIG. 7.

In the first and second exemplary embodiments as described above, when the rotation speed of the photosensitive drum 30 is less than the predetermined speed, the switching current becomes large by the APC. However, when the switching current is made large, it is probable in a certain design that a current exceeding a rating of the switching current circuit within the LD driving circuit 48 passes.

In the third exemplary embodiment, when the rotation speed of the photosensitive drum 30 is less than the predetermined speed, if the deflecting direction of the light beam is oriented toward the BD sensor 51, a switching current, which is substantially the same value as that of the switching current supplied when the rotation speed of the photosensitive drum 30 is equal to or more than the predetermined speed, is supplied.

Figure 7:
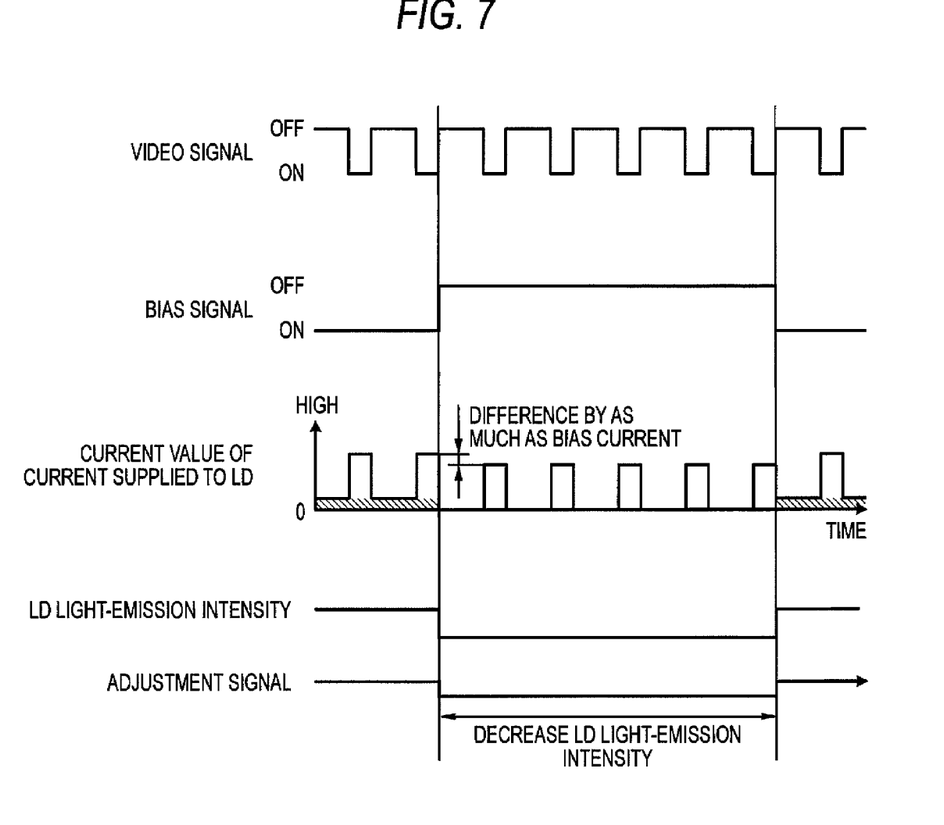
FIG. 7 is a timing chart according to a third exemplary embodiment of the present invention.

FIG. 7 is a timing chart according to the third exemplary embodiment. In the third exemplary embodiment, the LD light-emission intensity obtained when the rotation speed of the photosensitive drum 30 is less than the predetermined speed is made smaller than that obtained when the rotation speed of the photosensitive drum 30 is equal to or more than the predetermined speed. Specifically, the CPU 60 outputs to the LD driving circuit 48 an adjustment signal that would substantially equal the value of a current supplied to the LD 47 obtained when the rotation speed of the photosensitive drum 30 is less than the predetermined speed, i.e., the value of the switching current, to the value of the switching current obtained when the rotation speed of the photosensitive drum 30 is equal to or more than the predetermined speed. Thereby, it becomes possible to ensure that the switching current is not made larger than a case where the rotation speed of the photosensitive drum 30 is equal to or more than the predetermined speed, and possible to ensure that the current passing through the switching current circuit does not exceed the rating of the switching current circuit.

It is noted that when the rotation speed of the photosensitive drum 30 is less than the predetermined speed, merely obtaining the BD signal is sufficient. Thus, a target value of the switching current to be controlled by the APC may be, for example, approximately half the value of the switching current supplied when the rotation speed of the photosensitive drum 30 is equal to or more than the predetermined speed.

In other respects, the third exemplary embodiment is substantially identical to the first exemplary embodiment.

(Fourth Exemplary Embodiment)

Subsequently, a fourth exemplary embodiment of the present invention will be described with reference to FIG. 8.

In the fourth exemplary embodiment, even when the rotation speed of the photosensitive drum 30 is less than the predetermined speed, if the deflecting direction of the light beam is oriented toward the BD sensor 51, the bias current is supplied. The reason for this is to make it difficult to easily cause the following problem resulting from not supplying the bias current.

When the bias current is not supplied, the switching current is greatly fluctuated because the switching current is fluctuated by the APC by as much as the bias current. Thus, there is a possibility that the control by the LD driving circuit 48 becomes unstable.

There is a slight time lag in the adjustment by the APC, and thus, when the bias current is not supplied, there is a possibility that the current supplied to the LD 47 becomes small for an instant when supplying the bias current is stopped. On the other hand, there is a possibility that when supplying the bias current is started, the current supplied to the LD 47 becomes large for an instant.

Figure 8:
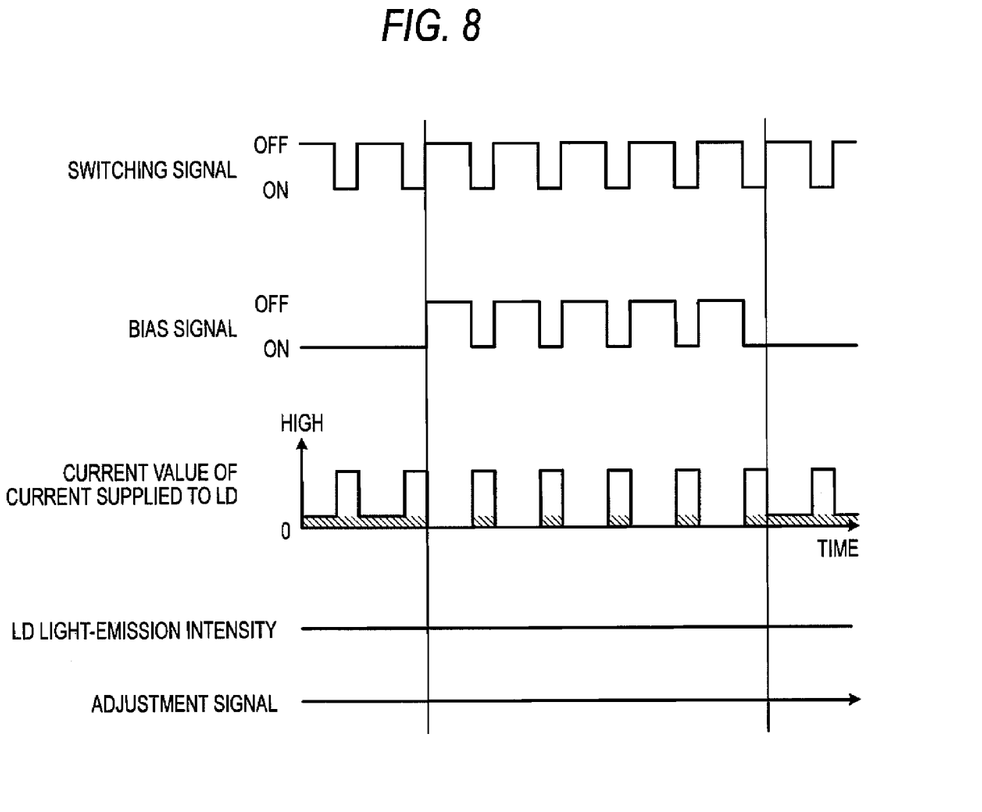
FIG. 8 is a timing chart according to a fourth exemplary embodiment of the present invention.

FIG. 8 is a timing chart according to the fourth exemplary embodiment. If the bias current is to be supplied when the deflecting direction of the light beam is oriented toward the BD sensor 51 even in the case where the rotation speed of the photosensitive drum 30 is less than the predetermined speed, it becomes possible to make it difficult to easily cause the above-described problem that results from not supplying the bias current.

A period during which the bias current is supplied when the rotation speed of the photosensitive drum 30 is less than the predetermined speed may optionally include a period during which the deflecting direction of the light beam is not oriented toward the BD sensor 51 as long as a period during which at least the deflecting direction of the light beam is oriented toward the BD sensor 51 is included. However, in this case, a period during which at least the deflecting direction of the light beam is oriented toward the image forming region 53 is excluded.

In other respects, the fourth exemplary embodiment is substantially identical to the first exemplary embodiment.

(Modified Exemplary Embodiments)

The present invention is not limited to the above-described exemplary embodiments. For example, an embodiment as set forth below may also be included in the technical scope of the present invention.

In the first to fourth embodiments, as an example, the rotation control of the polygon mirror and the APC have been described as control that is based on the detection signal output from the sensor. However, the control that is based on the detection signal output from the sensor is not limited thereto. Another control may be accepted as long as the control is control that is performed based on the detection signal even when the rotation speed of the photosensitive drum 30 is less than the predetermined speed.

In the first to fourth embodiments, as an example, a so-called monochrome printer for printing by using single-color toner has been described as the image forming apparatus 1. However, the image forming apparatus may be optionally a color printer using two or more colors for the toner.

In the first and fourth embodiments, as the image forming apparatus, the image forming apparatus 1 has been described as an example. However, a multifunction device including a scanner function, a printer function, a copy function, a facsimile function, etc., may be optionally applied to the present invention.

While the present invention has been shown and described with reference to certain exemplary embodiments thereof, it will be understood by those skilled in the art that various changes in form and details may be made therein without departing from the scope of the invention as defined by the appended claims.

What is claimed is:

1. An image forming apparatus comprising:
   a light source configured to emit a light beam;
   a light-source driving unit configured to drive the light source;
   a photosensitive member that comprises an image forming region;
   a determining unit configured to determine a level of a rotation speed of the photosensitive member;
   a scanner unit configured to expose the photosensitive member by deflecting the light beam emitted from the light source by a deflecting unit;
   a sensor configured to receive the light beam and output a detection signal; and
   a control unit configured to control the image forming apparatus based on the detection signal output from the sensor,
   wherein when the determining unit determines that the rotation speed is low, the light-source driving unit is configured:
      to drive the light source to emit the light beam when a deflecting direction of the light beam is oriented toward the sensor; and
      not to drive the light source to emit the light beam when the deflecting direction of the light beam is oriented toward the image forming region,
   wherein an intensity of the light beam emitted from the light source is configured to vary according to a current supplied to the light source,
   wherein the light-source driving unit is configured to supply:
      a first current configured to drive the light source to emit a light beam having a first intensity for exposing the photosensitive member with an intensity of greater than or equal to a predetermined exposure amount; and
      a second current configured to drive the light source to emit a light having a second intensity for exposing the photosensitive member with an intensity of less than the predetermined exposure amount,
   wherein when the deflecting direction of the light beam is oriented toward the sensor, the light-source driving unit is configured to supply the first current to the light source,
   wherein when the determining unit determines that the rotation speed of the photosensitive member is high, the light-source driving unit is configured to constantly supply the second current as a bias current to the light-source driving unit, and
   wherein when the determining unit determines that the rotation speed of the photosensitive member is low, the light-source driving unit is configured to stop supplying the bias current to the light source and to make a timing at which the light source is supplied with the first current faster than a timing at which the first current is supplied when the rotation speed of the photosensitive member is high.

2. The image forming apparatus according to claim 1, wherein the light-source driving unit is kept in an operable state even when the rotation speed of the photosensitive member is decreased.

3. The image forming apparatus according to claim 1, further comprising:
a speed detecting unit configured to detect the rotation speed of the photosensitive member,
wherein the determining unit is configured to determined the level of speed by comparing a speed detected by the speed detecting unit and a predetermined speed.

4. The image forming apparatus according to claim 1, further comprising:
a photosensitive-member driving unit configured to rotationally drive the photosensitive member; and
a conveying unit configured to convey a recorded medium one at a time, and, after an image is formed on a first surface of the recorded medium, to reverse and convey the recorded medium by using power of the photosensitive-member driving unit in order to form an image on a second surface of the recorded medium,
wherein when the conveying unit reverses the recorded medium, the power of the photosensitive-member driving unit is applied to the conveying unit so as to stop a rotation of the photosensitive member.

5. An image forming apparatus comprising:
a light source configured to emit a light beam;
a light-source driving unit configured to drive the light source;
a photosensitive member that comprises an image forming region;
a determining unit configured to determine a level of a rotation speed of the photosensitive member;
a scanner unit configured to expose the photosensitive member by deflecting the light beam emitted from the light source by a deflecting unit;
a sensor configured to receive the light beam and output a detection signal; and
a control unit configured to control the image forming apparatus based on the detection signal output from the sensor,
wherein when the determining unit determines that the rotation speed is low, the light-source driving unit is configured:
to drive the light source to emit the light beam when a deflecting direction of the light beam is oriented toward the sensor; and
not to drive the light source to emit the light beam when the deflecting direction of the light beam is oriented toward the image forming region,
wherein an intensity of the light beam emitted from the light source is configured to vary according to a current supplied to the light source,
wherein the light-source driving unit is configured to supply:
a first current configured to drive the light source to emit a light beam having a first intensity for exposing the photosensitive member with an intensity of greater than or equal to a predetermined exposure amount; and
a second current configured to drive the light source to emit a light having a second intensity for exposing the photosensitive member with an intensity of less than the predetermined exposure amount,
wherein when the deflecting direction of the light beam is oriented toward the sensor, the light-source driving unit is configured to supply the first current to the light source,
wherein when the determining unit determines that the rotation speed of the photosensitive member is high, the light-source driving unit is configured to constantly supply the second current as a bias current to the light-source driving unit, and
wherein when the determining unit determines that the rotation speed of the photosensitive member is low, the light-source driving unit is configured to stop supplying the bias current to the light source and to adjust a value of the first current supplied to the light source to substantially the same value as the first current supplied to the light source when the rotation speed of the photosensitive member is determined to be high.

6. The image forming apparatus according to claim 5, wherein the light-source driving unit is kept in an operable state even when the rotation speed of the photosensitive member is decreased.

7. The image forming apparatus according to claim 5, further comprising:
a speed detecting unit configured to detect the rotation speed of the photosensitive member,
wherein the determining unit is configured to determine the level of speed by comparing a speed detected by the speed detecting unit and a predetermined speed.

8. The image forming apparatus according to claim 5, further comprising:
a photosensitive-member driving unit configured to rotationally drive the photosensitive member; and
a conveying unit configured to convey a recorded medium one at a time, and, after an image is formed on a first surface of the recorded medium, to reverse and convey the recorded medium by using power of the photosensitive-member driving unit in order to form an image on a second surface of the recorded medium,
wherein when the conveying unit reverses the recorded medium, the power of the photosensitive-member driving unit is applied to the conveying unit so as to stop a rotation of the photosensitive member.

9. An image forming apparatus comprising:
a light source configured to emit a light beam;
a light-source driving unit configured to drive the light source;
a photosensitive member that comprises an image forming region;
a determining unit configured to determine a level of a rotation speed of the photosensitive member;
a scanner unit configured to expose the photosensitive member by deflecting the light beam emitted from the light source by a deflecting unit;
a sensor configured to receive the light beam and output a detection signal; and
a control unit configured to control the image forming apparatus based on the detection signal output from the sensor,
wherein when the determining unit determines that the rotation speed is low, the light-source driving unit is configured:
to drive the light source to emit the light beam when a deflecting direction of the light beam is oriented toward the sensor; and
not to drive the light source to emit the light beam when the deflecting direction of the light beam is oriented toward the image forming region,
wherein an intensity of the light beam emitted from the light source is configured to vary according to a current supplied to the light source,
wherein the light-source driving unit is configured to supply:

a first current configured to drive the light source to emit a light beam having a first intensity for exposing the photosensitive member with an intensity of greater than or equal to a predetermined exposure amount; and a second current configured to drive the light source to emit a light having a second intensity for exposing the photosensitive member with an intensity of less than the predetermined exposure amount, wherein when the deflecting direction of the light beam is oriented toward the sensor, the light-source driving unit is configured to supply the first current to the light source, wherein when the determining unit determines that the rotation speed of the photosensitive member is high, the light-source driving unit is configured to constantly supply the second current as a bias current to the light-source driving unit, and wherein when the determining unit determines that the rotation speed of the photosensitive member is low, the light-source driving unit is configured to stop supplying the bias current to the light source and to adjust a value of the first current supplied to the light source to a value less than that of the first current supplied to the light source when the rotation speed of the photosensitive member is determined to be high.

10. The image forming apparatus according to claim 9, wherein the light-source driving unit is kept in an operable state even when the rotation speed of the photosensitive member is decreased.

11. The image forming apparatus according to claim 9, further comprising:
a speed detecting unit configured to detect the rotation speed of the photosensitive member, wherein the determining unit is configured to determine the level of speed by comparing a speed detected by the speed detecting unit and a predetermined speed.

12. The image forming apparatus according to claim 9, further comprising:
a photosensitive-member driving unit configured to rotationally drive the photosensitive member; and a conveying unit configured to convey a recorded medium one at a time, and, after an image is formed on a first surface of the recorded medium, to reverse and convey the recorded medium by using power of the photosensitive-member driving unit in order to form an image on a second surface of the recorded medium, wherein when the conveying unit reverses the recorded medium, the power of the photosensitive-member driving unit is applied to the conveying unit so as to stop a rotation of the photosensitive member.

13. An image forming apparatus comprising:
a light source configured to emit a light beam;
a light-source driving unit configured to drive the light source;
a photosensitive member that comprises an image forming region;
a determining unit configured to determine a level of a rotation speed of the photosensitive member;
a scanner unit configured to expose the photosensitive member by deflecting the light beam emitted from the light source by a deflecting unit;
a sensor configured to receive the light beam and output a detection signal; and
a control unit configured to control the image forming apparatus based on the detection signal output from the sensor, wherein when the determining unit determines that the rotation speed is low, the light-source driving unit is configured:
to drive the light source to emit the light beam when a deflecting direction of the light beam is oriented toward the sensor; and
not to drive the light source to emit the light beam when the deflecting direction of the light beam is oriented toward the image forming region, wherein an intensity of the light beam emitted from the light source is configured to vary according to a current supplied to the light source, wherein the light-source driving unit is configured to supply:
a first current configured to drive the light source to emit a light beam having a first intensity for exposing the photosensitive member with an intensity of greater than or equal to a predetermined exposure amount; and
a second current configured to drive the light source to emit a light having a second intensity for exposing the photosensitive member with an intensity of less than the predetermined exposure amount, wherein when the deflecting direction of the light beam is oriented toward the sensor, the light-source driving unit is configured to supply the first current to the light source, wherein when the determining unit determines that the rotation speed of the photosensitive member is high, the light-source driving unit is configured to constantly supply the second current as a bias current to the light-source driving unit, and wherein when the determining unit determines that the rotation speed of the photosensitive member is low, the light-source driving unit is configured:
not to supply the bias current when the deflecting direction of the light beam is oriented toward the image forming region; and
to supply the bias current when the deflecting direction of the light beam is oriented toward the sensor.

14. The image forming apparatus according to claim 13, wherein the light-source driving unit is kept in an operable state even when the rotation speed of the photosensitive member is decreased.

15. The image forming apparatus according to claim 13, further comprising:
a speed detecting unit configured to detect the rotation speed of the photosensitive member, wherein the determining unit is configured to determine the level of speed by comparing a speed detected by the speed detecting unit and a predetermined speed.

16. The image forming apparatus according to claim 13, further comprising:
a photosensitive-member driving unit configured to rotationally drive the photosensitive member; and a conveying unit configured to convey a recorded medium one at a time, and, after an image is formed on a first surface of the recorded medium, to reverse and convey the recorded medium by using power of the photosensitive-member driving unit in order to form an image on a second surface of the recorded medium, wherein when the conveying unit reverses the recorded medium, the power of the photosensitive-member driving unit is applied to the conveying unit so as to stop a rotation of the photosensitive member.

* * * * *